United States Patent [19]

Linley, Jr.

[11] 3,977,269

[45] Aug. 31, 1976

[54] ANTI-BACKLASH, SELF-ALIGNING NUT

[75] Inventor: Francis M. Linley, Jr., Easton, Conn.

[73] Assignee: Universal Thread Grinding Company, Fairfield, Conn.

[22] Filed: May 5, 1975

[21] Appl. No.: 574,562

[52] U.S. Cl. .................................. 74/441; 74/409
[51] Int. Cl.² ........................................ F16H 55/18
[58] Field of Search ............... 74/89.15, 424.8, 441, 74/440, 409

[56] References Cited
UNITED STATES PATENTS

| | | | |
|---|---|---|---|
| 2,335,504 | 11/1943 | Gazda | 74/409 X |
| 2,493,000 | 1/1950 | Linsley | 74/441 |
| 2,567,483 | 9/1951 | Hotine | 74/441 |
| 3,121,340 | 2/1964 | Anthony | 74/409 |
| 3,592,075 | 7/1971 | Clark | 74/409 |
| 3,810,310 | 5/1974 | Morgan | 74/441 |

*Primary Examiner*—Samuel Scott
*Assistant Examiner*—Wesley S. Ratliff, Jr.
*Attorney, Agent, or Firm*—H. Gibner Lehmann; K. Gibner Lehmann

[57] ABSTRACT

An anti-backlash, self-aligning nut construction comprising specially constructed tubular nut bodies coacting with concentric spring sleeves of unique configuration to effect precise, self-aligning, anti-backlash assemblages. The nut bodies in general each have a pair of spring-biased elements provided with internal thread formations adapted for engagement with the external threads of a screw. In one embodiment of the invention a self-aligning spring sleeve is provided having solely three pairs of oppositely-disposed transverse slots to obtain the desired aligning feature. The nut body has a base portion which is separated from the spring-biased elements by means of two transverse slots which, together with an adjacent pair of slots in the spring sleeve, form in effect a universal joint. One of the remaining slot pairs in the sleeve is oriented circumferentially with respect to the first pair by an angle of 90°, with the third pair of slots being circumferentially aligned with the first pair.

23 Claims, 35 Drawing Figures

U.S. Patent  Aug. 31, 1976  Sheet 1 of 4  3,977,269
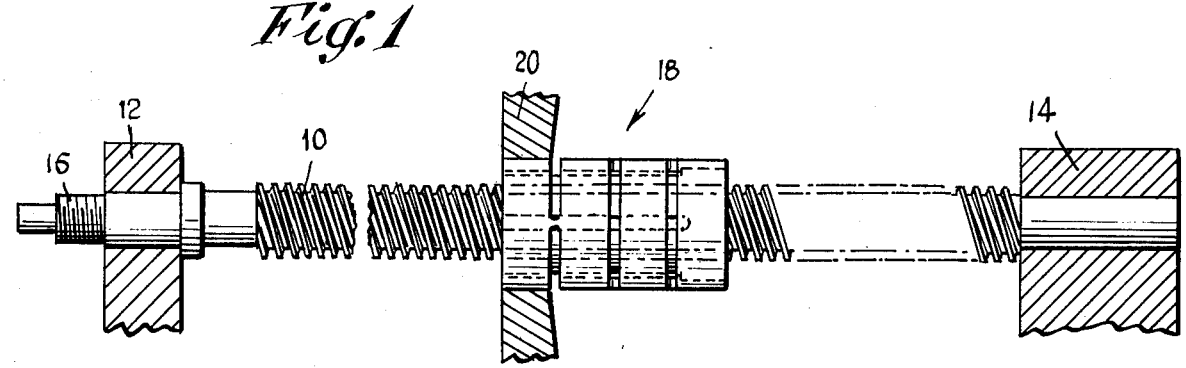
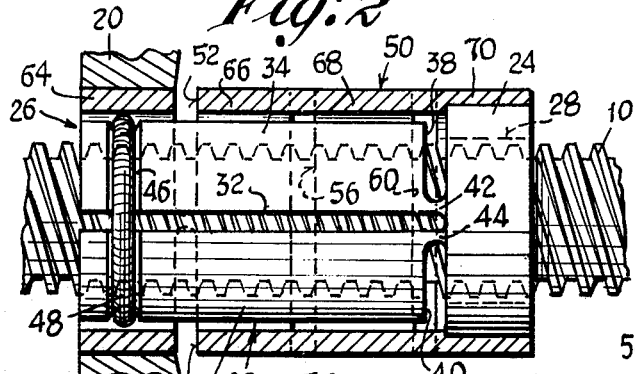
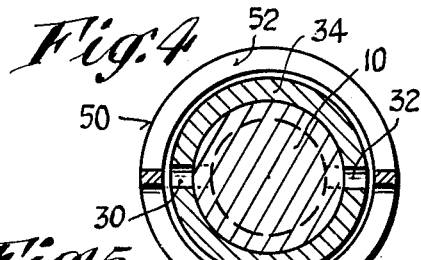
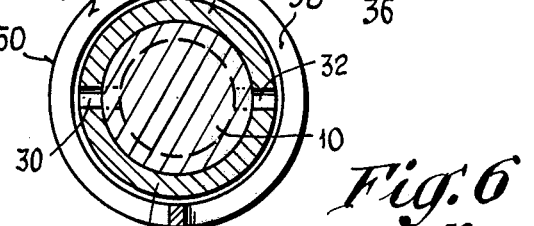
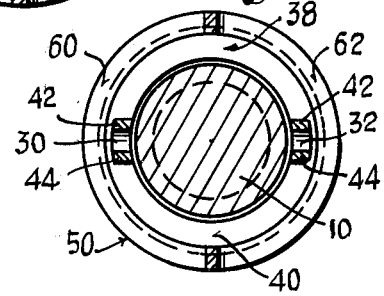
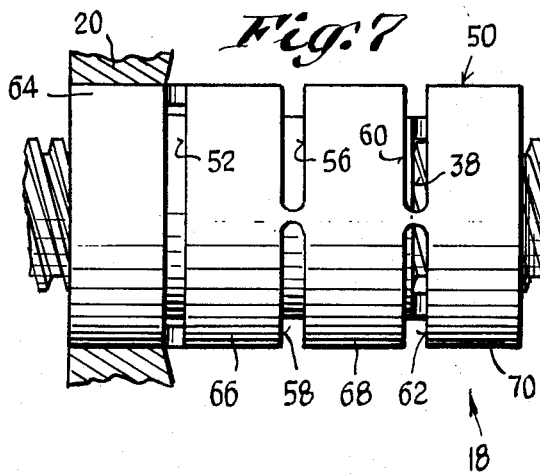
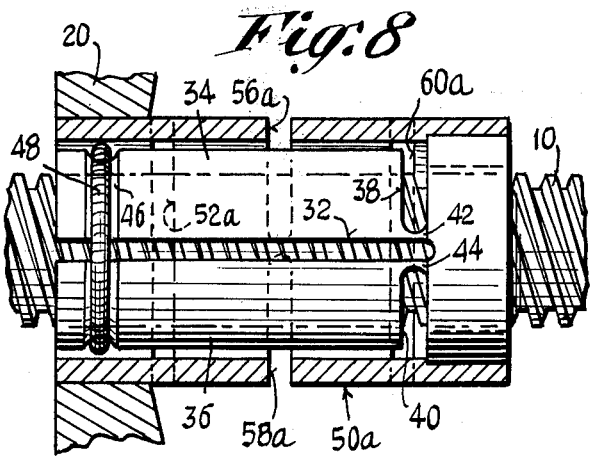

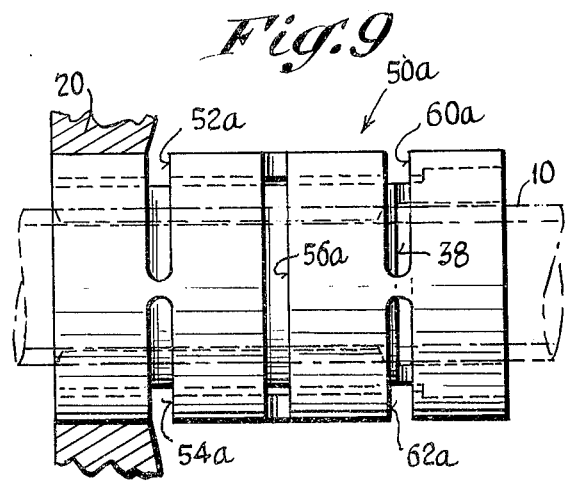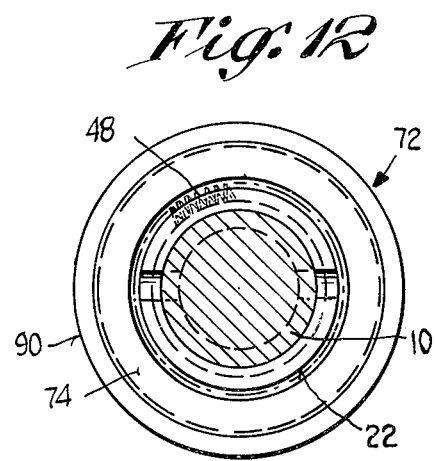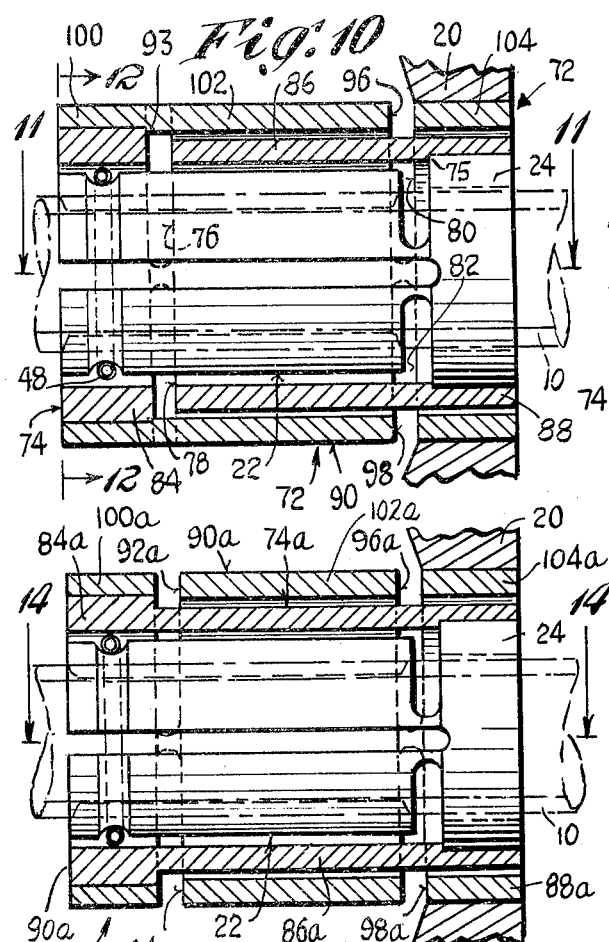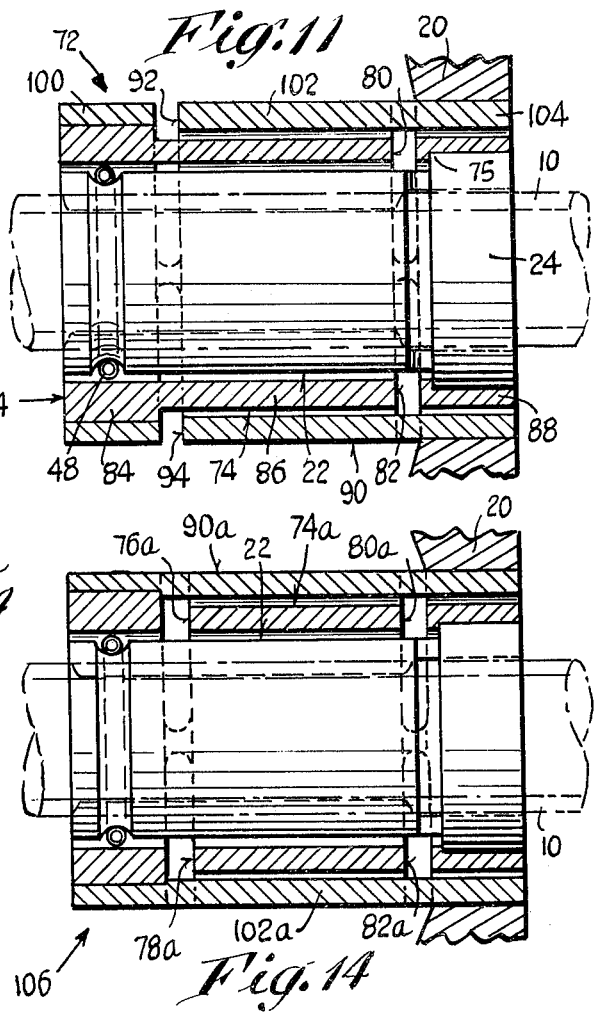

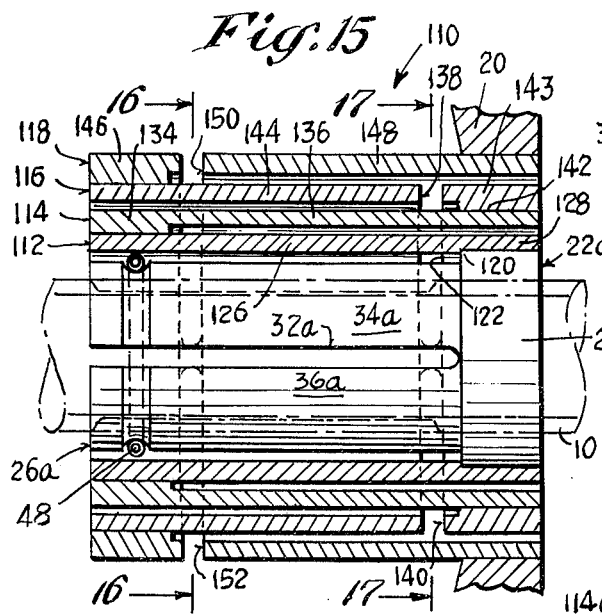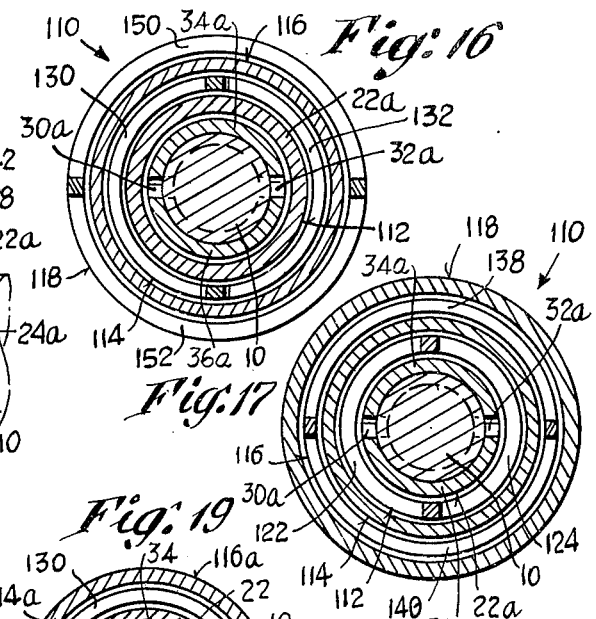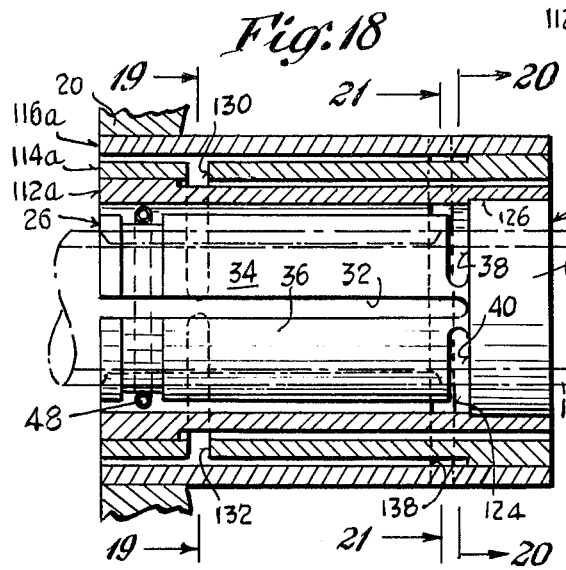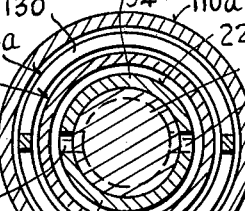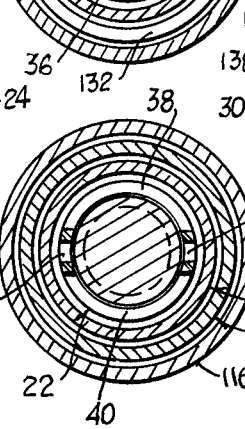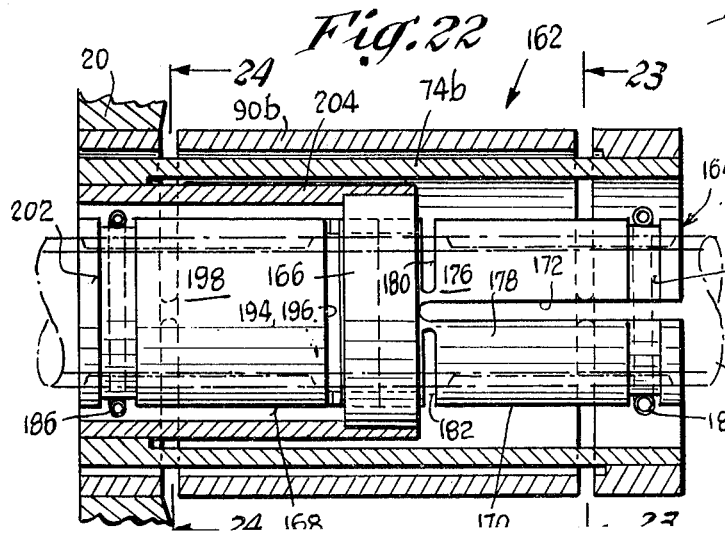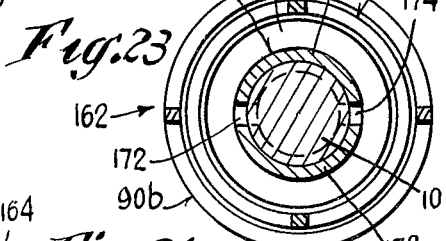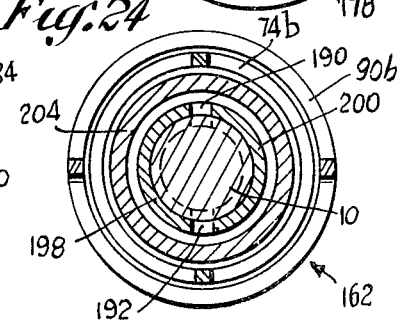

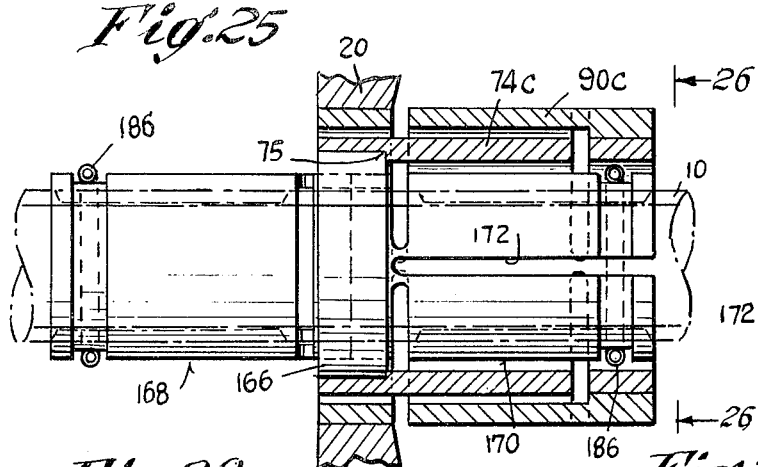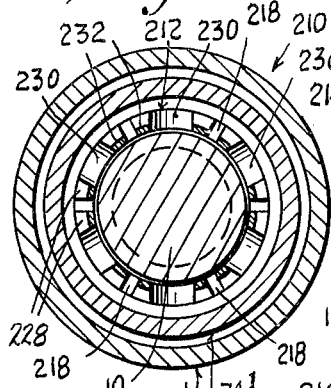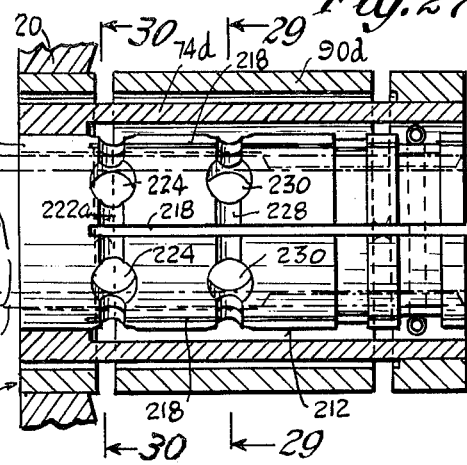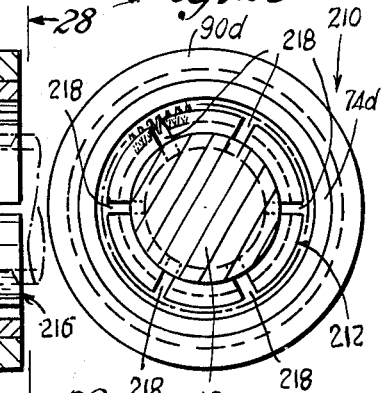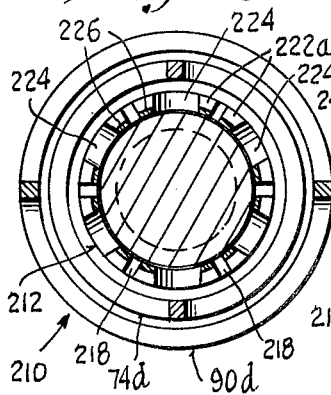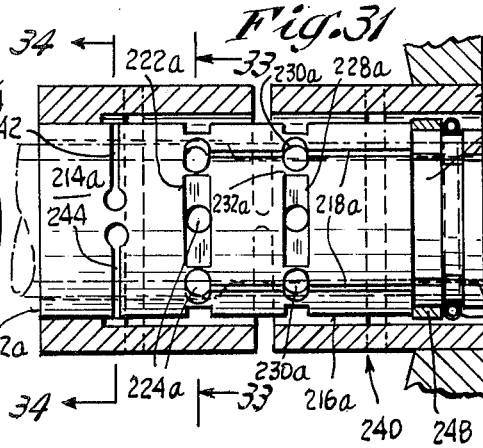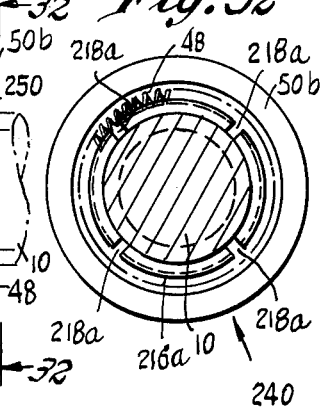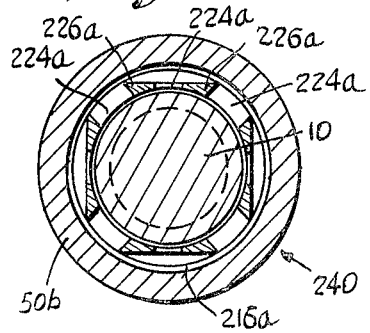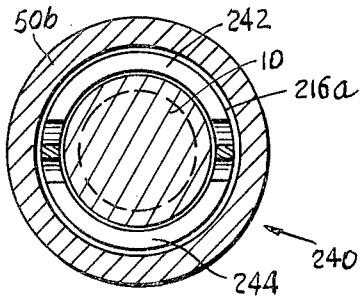

ANTI-BACKLASH, SELF-ALIGNING NUT

BACKGROUND

This invention relates generally to nut follower devices adapted to engage external threads of a screw, and more particularly to devices of this type which minimize undesirable backlash between the nut and screw, and which compensate for slight misalignments between the screw and the machine part that is adapted to carry the nut.

Specifically, this invention relates to improvements in the applicant's anti-backlash nut illustrated and described in U.S. Pat. No. 3,831,460, issued Aug. 27, 1974.

The device disclosed in the above patent involves a tubular nut body having two elements with internal thread formations which are adapted to engage the external threads of a screw, together with a spring sleeve having four pairs of oppositely disposed transverse slots, wherein each of the adjacent pairs of slots in the sleeve is indexed circumferentially by an angle of 90° with respect to the other. While this device generally operated in a satisfactory manner, in some cases it was desired to provide increased self-alignment capability beyond that which was available from the patented construction. In addition, due to the fact that the spring sleeve has four pairs of slots, there was a tendency for the sleeve to become expanded or compressed when the nut device was subjected to heavy loads. This occurred by virtue of the 90° orientation between each of the adjacent slot pairs. Also, due to the relatively close spacing of the four slot pairs, there was a limitation on the maximum misalignment which could be tolerated, while still providing satisfactory performance and smooth operation.

SUMMARY

The above limitations of my prior nut follower devices are obviated by the present invention, which has for an object the provision of a novel and improved anti-backlash, self-aligning nut which is especially simple in its construction, reliable in operation, and which provides improved performance from the standpoint of compensation for substantial misalignments between a machine part and a screw. Another object of the invention is the provision of a self-aligning nut construction as above, which has a reduced overall cost. Still another object of the invention is the provision of an anti-backlash nut which provides improved averaging to minimize errors due to minute variations in the thread formations of a screw at adjacent points thereon.

These objects are accomplished by the provision of an anti-backlash, self-aligning nut construction comprising an elongate tubular nut body having a base portion and connected thereto an internally threaded portion which has multiple longitudinal slots that divide it into multiple elements whose thread formations are adapted for contact with the screw threads. The base portion of the body has a pair of oppositely-disposed transverse slots enabling the threaded elements to have limited movement in radial directions with respect to the screw axis. Yieldable means are carried by the threaded elements for biasing them toward one another so as to maintain an intimate engagement of the threaded formations thereof with the screw threads. An elongate spring sleeve surrounds and is concentric with the nut body. The spring sleeve is provided with solely three pairs of oppositely-disposed transverse slots which are spaced apart from one another along its length. One of the slot pairs is adjacent to the transverse slots of the body and is circumferentially indexed by an angle of substantially 90° with respect thereto, so as to form a universal joint. The remaining two pairs of the sleeve are indexed by 90° with respect to one another to enable pivotal movement of the adjacent sleeve parts.

One extreme sleeve part carries the nut body, and the other extreme sleeve part is adapted to be secured to a reciprocating part of a machine.

The above objects are accomplished in another embodiment of the invention by the provision of a nut construction comprising an elongate tubular nut body, a first elongate sleeve surrounding and concentric with the nut body, and a second elongate sleeve concentric with and surrounding the first, wherein each of the sleeves has two pairs of oppositely-disposed transverse slots. Two of the above slot pairs are circumferentially aligned with one another and displaced or indexed from the remaining two by an angle of substantially 90°. The sleeves provide the necessary compensation for slight misalignment between the axis of the screw and the machine part which carries the nut.

The objects are accomplished in yet another embodiment of the invention by a nut construction comprising a tubular nut body and four concentrically disposed spring sleeves wherein each of the sleeves has a single pair of oppositely-disposed transverse slots, the orientation of the slots being such that two of the slot pairs are circumferentially aligned with one another, with the remaining two also being circumferentially aligned but indexed by an angle of 90° with respect to the first two.

Still another embodiment of the invention involves a nut body having a pair of oppositely-disposed transverse slots, and three concentrically disposed spring sleeves with each of the sleeves having a pair of oppositely-disposed transverse slots. The arrangement is such that slots in the tubular nut body are circumferentially indexed by an angle of substantially 90° with respect to the slots in the innermost sleeve, to thus form in effect a universal joint. The remaining slots in the center one of the sleeves and in the outer sleeve, respectively are also indexed with respect to one another by an angle of substantially 90°.

In still another embodiment of the invention, the objects are accomplished by a nut construction comprising a tubular body including a base portion and two threaded portions extending axially in opposite directions from the base portion, each threaded portion being constituted of multiple elements which are movable with respect to the axis of the screw in radial directions. The above construction constitutes a double-ended nut, which is employed in a preferred embodiment of the invention with two concentrically disposed spring sleeves, each of the sleeves having two pairs of oppositely disposed transverse slots.

The objects are accomplished in still another embodiment of the invention by the provision of a tubular nut body comprising a multiplicity of elements having peripheral recesses defining thin and narrow hinge portions, thereby enabling the elements to readily undergo radially inward movement with respect to the axis of the screw. In addition, a second series of peripheral recesses is provided, spaced from the first, thus constituting a "double-hinge" nut. Such a construction enables relatively large portions of the elements adjacent the free ends thereof to undergo substantially translational movement toward and away from the axis of the screw. In one embodiment of the invention such a double-hinge nut is employed with a pair of concentrically disposed spring sleeves. In another embodiment, a double-hinge nut is employed with a single spring sleeve having solely three pairs of oppositely-disposed transverse slots, wherein the tubular nut body is provided with an additional pair of transverse slots to provide the necessary self-alignment action.

Other features and advantages will hereinafter appear.

In the drawings, illustrating the various embodiments of the invention:

FIG. 1 is a view partly in section and partly in side elevation, of a self-aligning anti-backlash nut construction constituting a preferred embodiment of the present invention.

FIG. 2 is a view partly in vertical section and partly in elevation, of the nut construction of FIG. 1 showing additional details of the nut body.

FIG. 3 is an axial section of the nut construction of FIGS. 1 and 2.

FIG. 4 is a transverse section taken on line 4—4 of FIG. 3.

FIG. 5 is a transverse section taken on line 5—5 of FIG. 3.

FIG. 6 is a transverse section taken on line 6—6 of FIG. 3.

FIG. 7 is a top plan view of the nut construction of FIGS. 1-6.

FIG. 8 is a view, partly in axial vertical section and partly in elevation, of a modified nut construction constituting another embodiment of the invention.

FIG. 9 is a top plan view of the nut construction of FIG. 8.

FIG. 10 is a view, partly in axial vertical section and partly in elevation, of another embodiment of the invention wherein a tubular nut body is employed with two concentric spring sleeves.

FIG. 11 is a horizontal axial section taken on line 11—11 of FIG. 10.

FIG. 12 is a transverse section taken on line 12—12 of FIG. 10.

FIG. 13 is a view, partly in axial vertical section and partly in elevation, of another embodiment of the invention showing a tubular nut body and a pair of concentrically disposed spring sleeves, wherein the orientation of the slots in the sleeves has been modified.

FIG. 14 is a horizontal axial section taken on line 14—14 of FIG. 13.

FIG. 15 is a view, partly in axial vertical section and partly in elevation, of another embodiment of the invention wherein a tubular nut body is employed with four concentrically disposed spring sleeves.

FIG. 16 is a transverse section taken on line 16—16 of FIG. 15.

FIG. 17 is a transverse section taken on line 17—17 of FIG. 15.

FIG. 18 is a view, partly in axial vertical section and partly in elevation, of a modified nut construction having a tubular nut body and three concentrically disposed spring sleeves, constituting another embodiment of the invention.

FIG. 19 is a transverse section taken on line 19—19 of FIG. 18.

FIG. 20 is a transverse section taken on line 20—20 of FIG. 18.

FIG. 21 is a transverse section taken on line 21—21 of FIG. 18.

FIG. 22 is a view, partly in axial vertical section and partly in elevation, of a further modified nut construction employing a tubular nut body having two oppositely extending threaded portions engaging the threads of a screw at widely spaced points for averaging minute variations therein, together with two concentrically disposed spring sleeves.

FIG. 23 is a transverse section taken on line 23—23 of FIG. 22.

FIG. 24 is a transverse section taken on line 24—24 of FIG. 22.

FIG. 25 is a view, partly in axial vertical section and partly in elevation, of a still further modified double-ended nut employed with two concentrically disposed spring sleeves, constituting still another embodiment of the invention.

FIG. 26 is a right-end elevation of the device of FIG. 25.

FIG. 27 is a view, partly in axial vertical section and partly in elevation of a still further modified nut construction, constituting a double-hinge nut employed with two concentrically disposed spring sleeves, constituting still another embodiment of the invention.

FIG. 28 is a transverse section taken on line 28—28 of FIG. 27.

FIG. 29 is a transverse section taken on line 29—29 of FIG. 27.

FIG. 30 is a transverse section taken on line 30—30 of FIG. 27.

FIG. 31 is a view, partly in axial vertical section and partly in elevation, of a modified double-hinge nut adapted to be employed with a single spring sleeve, constituting yet another embodiment of the invention.

FIG. 32 is a transverse section taken on line 32—32 of FIG. 31.

FIG. 33 is a transverse section taken on line 33—33 of FIG. 31.

FIG. 34 is a transverse section taken on line 34—34 of FIG. 31.

FIG. 35 is a plan or end view of an annular limit ring which is employed with the embodiment of FIGS. 33-36, in order to limit the radially outward movement of the elements as during sudden acceleration of the nut or screw, under the application of shock loads thereto.

Referring first to FIG. 1, there is illustrated a screw 10 carried in end bearings 12, 14, the screw having a threaded end portion 16 adapted to be connected to a drive motor (not shown) or the like.

Associated with the screw 10 is a self-aligning, anti-backlash nut generally designated by the numeral 18, adapted for connection to a machine part 20 for movement in directions parallel to the axis of the screw 10. As shown in FIGS. 2 and 3, the self-aligning nut 18 comprises an elongate tubular nut body 22, having a base portion 24 and a threaded portion 26. The base portion has a through bore 28 to receive the screw, with the threaded portion 26 having internal thread formations adapted for engagement with the external threads of the screw. The threaded portion 26 is elongate and has two longitudinal slots 30, 32 which divide it into two elements 34, 36, each of which is capable of radially inward movement with respect to the axis of the screw. In addition, the nut body has a pair of oppositely-disposed transverse slots 38, 40, adjoining the longitudinal slots 30, 32, thereby forming two thin hinge sections 42, 44, which facilitate the radially inward movement of the elements 34, 36. An annular groove 46 extending around the periphery of the free ends of the elements carries a spring coil 48, or alternately an O-ring. The coil tends to bias the elements 34, 36 inward into intimate engagement with the threads of the screw, with a minimum of clearance and looseness.

Rigidly secured to the base portion 24 of the nut body is a self-aligning sleeve generally designated by the numeral 50, the sleeve having three pairs of oppositely-disposed transverse slots 52, 54; 56, 58; and 60, 62. The abutting surfaces of the base portion 24 and sleeve 50 are sand-blasted prior to assembly and cemented together by a suitable adhesive of the type known by the designation, "Loc-tite" (a registered trademark). The slots divide the sleeve 50 into four portions 64, 66, 68, and 70, each of which is capable of limited flexing movement with respect to an adjacent portion.

Returning to FIGS. 2–7 in accordance with the present invention, the self-alignment sleeve 50 includes only three slot pairs, one of the slot pairs 60, 62 being closest to the transverse slots 38, 40 of the nut body, and circumferentially indexed with respect thereto by an angle of substantially 90°. In addition, the remaining pairs 52, 54, and 56, 58 are also circumferentially indexed with respect to one another by an angle of 90°. This is clearly shown in FIGS. 4–7. By such an arrangement, the portion 70 of the self-alignment sleeve 50 (and the base portion 24 of the nut body) are capable of limited flexing movement with respect to the elements 34, 36 in a first plane, and the portion 68 of the alignment sleeve is capable of limited flexing movement with respect to the portion 70 thereof (and the base portion 24 of the nut body), in a second plane which is substantially perpendicular to the first. It will be understood that the slots 38, 40 thus cooperate with the slot pair 60, 62 of the sleeve 50 to provide universal joint action between the portion 68 and the elements 34, 36 of the nut body. In a similar manner, the portion 66 of the self-alignment sleeve is capable of flexing movement with respect to the portion 68 in a first plane, and the portion 64 of the self-alignment sleeve is similarly capable of movement with respect to the portion 66 in a second plane which is perpendicular to the first. In the present embodiment it will be understood that the portion 64 of sleeve 50 is adapted to be carried by the machine part 20. The arrangement is such that due to the biasing spring 48 which urges the element into intimate engagement with the screw, virtually all looseness and slop which would otherwise contribute considerable backlash to the nut are eliminated. In addition, the provision of the sleeve effectively compensates for slight misalignments between the path of travel of the machine part and the screw axis. As a result, very accurate tracking is realized, with freedom from looseness, jamming or binding.

The three slot pair sleeve of the present invention provides several important advantages over the four slot pair sleeve of the prior art. For the same overall length of the sleeve, the three pair provides improved stiffness (less compression/expansion under load), since there is one less hinge involved. Also, due to the increased distance between the slot pairs, greater ability to compensate for misalignment is realized in the three slot pair sleeve. Lastly, the three slot pair sleeve is less expensive to manufacture and produce, and thus constitutes an improved device.

Another embodiment of the invention is illustrated in FIGS. 8 and 9, wherein like reference numerals indicate similar parts. By the present invention, an improved nut construction is provided, comprising a modified self-alignment sleeve 50a having solely three pairs of oppositely-disposed transverse slots, the pairs being designated by the numerals 52a, 54a; 56a, 58a; and 60a, 62a. As in the previous embodiment, the slots 60a, 62a are circumferentially indexed with respect to the slots 38, 40 of the nut body by an angle of substantially 90°. However, the non-adjacent slot pairs in the self-alignment sleeve 50a are seen to be substantially in circumferential alignment with one another, whereas the center slot pair 56a, 58a is shown as being indexed circumferentially with respect thereto by an angle of substantially 90°. Such an arrangement provides the same advantages as those of the first embodiment, with respect to minimizing looseness and clearance between the elements 34, 36 of the nut body and the threads of the screw 10, and with respect to providing increased self-alignment capability. The main difference is that the embodiment of FIGS. 1–7 provides a slightly stiffer sleeve, by virtue of the fact that the slot pairs 56, 58 and 60, 62 are aligned with one another. This has the effect of minimizing relative axial movement between the sleeve portions 66 and 70. Such axial movement occurs to a greater extent with the sleeve construction shown in FIGS. 9 and 10, since the adjacent slot pairs in the self-alignment sleeve 50a are all indexed by 90° with respect to one another.

Another embodiment of the invention is shown in FIGS. 10–12, illustrating an anti-backlash, self-aligning nut device generally designated by the numeral 72, and comprising a nut body 22 which is substantially identical to that illustrated and described in connection with FIGS. 1–7. The nut body 22 has internal thread formations adapted for intimate engagement with external threads of the screw 10.

Connected with the base portion 24 of the nut body 22 and concentric therewith is an elongate sleeve generally designated 74, having an internal shoulder 75 which abuts the base portion 24. As shown in FIGS. 10 and 11, the sleeve 74 has two pairs of oppositely disposed transverse slots 76, 78 and 80, 82, which divide the sleeve into three portions 84, 86, and 88 which are capable of limited flexing movement with respect to one another. Surrounding and concentric with the first sleeve 74, is an additional sleeve 90, also having two pairs of transverse slots 92, 94 and 96, 98 spaced along the length of the sleeve. The sleeve 90 has an internal shoulder 93 which is pressed on to the portion 84 of the inner sleeve 74 and fastened by suitable cement as above. The slots in the outer sleeve 90 divide it into three portions 100, 102 and 104, the latter being adapted to be engaged by a machine part 20.

As shown in FIG. 10, the pair of slots 76, 78 is circumferentially indexed with respect to the pair 80, 82 by an angle of substantially 90°. Similarly, the slots 96, 98 in the outer sleeve 90 are seen to overlie the slots 80, 82 and are indexed with respect thereto by an angle of substantially 90°. In addition, slots 92, 94 are circumferentially indexed with respect to the slots 96, 98 by an angle of 90°. The above arrangement enables the three portions of the sleeves 74 to have limited flexing movement with respect to one another, the same being true of the portions of sleeve 90. The sleeves are thus seen to provide universal joint action between the base portion 24 of the nut body 22 and the portion 104 of the outer sleeve 90. Such an arrangement provides a limited self-alignment capability between the nut body (and screw 10) with respect to the machine part 20. The above construction has several distinct advantages. The two sleeve arrangement is stiffer than the single sleeve, and thus undergoes less expansion/contraction under load. Due to the increased distance between the slot pairs on each sleeve, greater alignment capability is realized. In addition, the two sleeve construction provides true universal joint action because the hinges at each end of both sleeves are in the same lateral position.

Another embodiment of the invention is illustrated in FIGS. 13 and 14, showing a nut follower device 106 comprising a nut body 22 substantially identical to that discussed in connection with FIGS. 1–7, and accordingly not needing further description. In the present embodiment, inner and outer sleeves 74a, 90a respectively are provided, which are concentric both with one another and with the nut body 22. As in the previous embodiment, sleeve 74a has a first pair of transverse slots 76a, 78a, and a second pair of transverse slots 80a, 82a. It can be seen that both of these pairs of slots in the inner sleeve 74a are substantially in circumferential alignment with one another. Similarly, the outer sleeve 90a has transverse slot pairs 92a, 94a and 96a, 98a, these latter two pairs also being circumferentially aligned with one another. This arrangement provides improved stiffness to the sleeves, in that relative axial movement between adjacent portions of each sleeve is greatly minimized. For example, there is minimum axial movement between the sleeve portion 84a with respect to the sleeve portion 88a, since both hinges of this sleeve are aligned. The same is true of the portions 100a and 104a of the outer sleeve 90a. As a result, much stiffer connection is had between the base portion 24 of the nut body and the clamp 20 than with the arrangement of FIGS. 10–12. This has been found to be desirable for certain installations, where the applied loads are sufficient to cause considerable expansion/compression of the opposite ends of such a sleeve.

In addition, it has been found that the increased length of the central portions of each sleeve (86a, 102a) enables substantially greater mis-alignments to occur between the clamp 20 and the screw axis 10 without adversely affecting the follower operation of the nut device on the screw. Consequently, the device of FIGS. 10–12, as well as that of FIGS. 13–14, are seen to be capable of accommodating substantially greater misalignments than would otherwise be possible if only a single sleeve were provided, with all the slots spaced along the length of such a single sleeve, as in the construction of the prior art devices.

Another embodiment of the invention is illustrated in FIGS. 15–17, showing a self-aligning, anti-backlash nut 110, comprising a somewhat modified nut body 22a of tubular configuration, the body comprising a base portion 24a and a threaded portion 26a. The latter has a pair of longitudinal slots 30a, 32a which divide it into two elements 34a, 36a which are capable of movement in radial directions with respect to the axis of the screw, toward and away from one another. In this embodiment, the transverse slots in the nut body have been eliminated. The base portion 24a carries an inner sleeve 112 which has a shoulder 120 secured thereagainst by means of a suitable cement as in the previous embodiments. In addition, three additional sleeves are provided, concentric with the first, the additional sleeves being designated 114, 116 and 118. The inner sleeve 112 has a single pair of transverse slots 122, 124, which divide it into two portions 126, 128 which are capable of limited pivoting movement with respect to one another. The second sleeve 114 has an internal shoulder 134 engaged with the portion 126 of sleeve 112. Suitable cement provides a permanent joint or bond therebetween. The second sleeve 114 includes a single pair of transverse slots 130, 132, which divide the sleeve into two portions 134, 136, also capable of limited flexing movement with respect to one another. Sleeve 116 has an internal shoulder 142 affixed to the portion 136 of sleeve 114, and includes transverse slots 138, 140 dividing it into two portions 143, 144. In a similar manner, the sleeve 118 is provided with transverse slots 150, 152 dividing it into two portions 146, 148. A shoulder on the portion 146 engages the portion 144 of the sleeve 116 and is cemented thereto. The expansive cylindrical portion 148 of the outermost sleeve 118 provides a large area to which a clamp 20 can be secured for the purpose of connecting the nut device 110 to a machine part adapted to undergo movement in directions substantially parallel to the screw axis.

Several advantages of the above construction are apparent. Due to the large axial expanse between the single pair of slots on each sleeve and the pair of slots on the adjacent sleeve, a higher degree of self-alignment is possible than would be realized with sleeves having multiple slot pairs. In addition, the four sleeve arrangement provides the greatest amount of axial stiffness for a given sleeve length. Also, the outersleeve has an expansive cylindrical area of increased dimension to which a clamp may be affixed. Finally, the four sleeve nut provides true universal joint action.

As shown in FIGS. 16 and 17, the slot pair 122, 124 is in circumferential alignment with the slot pair 130, 132. Similarly, the slot pair 138, 140 is in circumferential alignment with the slot pair 150, 152. These latter two slot pairs are indexed by 90° with respect to the aligned slot pair 122, 124 and 130, 132.

While this has been found to provide a satisfactory arrangement, alternate accommodations of slot indexing are possible. For example, in the four sleeve arrangement described above, the slots in each sleeve can be indexed 90° from the slots in the next adjacent sleeve, such that the slots in the second and the fourth (outer) sleeves would be circumferentially aligned with one another, as would the slots in the first and third, with the latter being indexed with respect to the second and fourth sleeves by an angle of 90°. Such an arrangement has been found to provide equally satisfactory results. In FIG. 15, the annular groove adjacent the free ends of the elements 34a, 36a is adapted to receive a coil spring or O-ring 48, which biases the elements into intimate engagement with the threads of the screw, as in the previous embodiments.

Still another embodiment of the invention is illustrated in FIGS. 18–21, showing a tubular nut body 22 which is substantially of the same construction as that illustrated and described in connection with FIGS. 1–7. The body comprises a base portion 24, and a threaded portion 26 divided into two elements 34, 36 by means of longitudinal slots 30, 32. In addition, the body is provided with a pair of oppositely-disposed transverse slots 38, 40, which enable the elements 34, 36 to have limited movement toward and away from one another. The base portion 24 of the body 22 is received in an annular recess 126 on the inner surface of a sleeve 112a. The latter includes slots 122, 124 (FIG. 21) which are circumferentially indexed by an angle of substantially 90° with respect to the transverse slots 38, 40 in the nut body 22. Similarly, a second sleeve 114a includes slots 130, 132 (FIG. 19) which are indexed by 90° with respect to the slots 122, 124, and an outer sleeve 116a includes slots 138, 140 (FIG. 21) which are indexed by 90° with respect to the slots 130, 132.

The transverse slots 38, 40 in the nut body 22, together with the slot pair 122, 124 thus constitute a universal joint, with the remaining slot pairs 130, 132 and 138, 140 providing additional self-aligning joint action. The broad surface in FIG. 18 to the left of the slot pair 138, 140 is available for clamping the device to a suitable machine part 20.

The three sleeve arrangement provides generally the same advantages as the four sleeve nut, at somewhat lower cost due to the elimination of one sleeve.

Another embodiment of the invention is illustrated in FIGS. 22–24, showing a nut device 162 comprising a double-ended, tubular nut body 164 having a base portion 166, and two threaded portions 168, 170, which extend in opposite axial directions from the base portion. The threaded portion 170 has longitudinal slots 172, 174 (FIG. 23) which divide it into a pair of elements 176, 178, and transverse slots 180, 182 which enable the elements 176, 178 to have limited radially-inward movement with respect to the screw axis. An annular groove 184 carries a spring or O-ring 186 which biases the elements into intimate engagement with the threads of the screw. In a similar manner the other threaded portion 168 has two transverse slots 194, 196, and two longitudinal slots 190, 192 which divide it into two elements 198, 200 also capable of limited radially-inward movement with respect to the screw axis. An annular groove 202 carries a spring 186. Cemented to the base portion 166 of the double-ended nut body 170 is a rigid connector sleeve 204. Disposed at one end of the rigid sleeve 204 is a first self-alignment sleeve 74b which is similar in configuration to that illustrated in FIG. 13. Carried by the sleeve 74b is an additional self-alignment sleeve 90b, the two sleeves each having two pairs of oppositely disposed transverse slots. In this embodiment, the pairs of slots in the sleeve 74b are both shown as being circumferentially aligned with one another. This is also true of the slots in the sleeve 98b. However, it is possible to index one pair of slots in the sleeve 74b with respect to the second pair of slots, and at the same time index the pairs of slots in the sleeve 90b, in which case the adjacent pairs of slots in each sleeve would also be indexed from one another by 90°. A portion of the sleeve 90b to the extreme left in FIG. 22 is adapted to be engaged by a machine part 20.

The advantage of the present construction over single-ended nuts is that there is eliminated "shake" between the nut and the screw. In addition, minute lead errors in the screw are effectively averaged out by virtue of the fact that two distinct threaded portions 168, 170 engage the thread at spaced-apart intervals therealong. A somewhat improved averaging is accomplished by indexing the slots 172, 174 with respect to the slots 190, 192 such that the latter are in a plane which is non-coincidental with respect to that containing the slots 172, 174. Even better averaging can be realized by employing three or more elements on each threaded portion 168, 170. However, such an arrangement has not been illustrated in the interest of keeping the present disclosure as concise as possible.

Yet another embodiment of the invention is illustrated in FIGS. 25–26, showing a double-ended nut which is substantially identical in construction to that illustrated in FIG. 22, the nut comprising a base portion 166, and oppositely extending threaded portions 168, 170. The rigid sleeve 204 illustrated in FIG. 22 has been removed, in order to simplify the overall construction, and reduce cost.

By the present invention, two concentric sleeves are associated with the double-ended nut, the sleeves being designated 74c and 90c. The sleeve 74c is similar to that discussed in connection with FIG. 10, and has two pairs of oppositely disposed transverse slots which are indexed with respect to one another by 90°. An internal shoulder 75 on this sleeve engages the base portion 166 of the double-ended nut. Similarly, the outer sleeve 90c has two pairs of oppositely-disposed transverse slots which are also indexed with respect to one another. The left end of the outer sleeve 90c illustrated in FIG. 25 is adapted to be engaged by a suitable machine part 20. The embodiment of FIGS. 25 and 26 provides lead screw averaging substantially the same as that of the embodiment of FIG. 22. However, due to the shorter distance between the slot pairs of each sleeve, a somewhat lesser degree of self-alignment is possible. This construction may be desirable where space limitations would dictate that the overall axial length and radial dimensions of the nut follower device be as small as possible.

Still another embodiment of the invention is illustrated in FIGS. 27–30, showing a self-aligning, anti-backlash nut device 210 comprising a tubular nut body 212 having a base portion 214 and a threaded portion 216. The latter has a plurality of longitudinal slots 218 which divide it into multiple elements capable of limited radially inward movement with respect to one another. In accordance with the present invention, the body 212 has annular recesses 222, extending about its periphery, so as to present reduced wall thicknesses of the elements. These reduced wall thicknesses are particularly shown in FIG. 30. In addition, a plurality of radially extending holes 224 extend completely through the walls of the elements, so as to provide thin and narrow hinges 226 on opposite sides of the holes 224. An additional annular recess 228 (FIGS. 27, 29) extends around the periphery of the nut body 212 which, together with additional holes 230, present reduced wall thicknesses or hinges 232. The provision of double hinges 226, 232 enables movement of large areas of the elements adjacent their free ends toward one another, which has the effect of allowing a parallel contraction of the elements toward the screw threads in order to compensate for minute changes in dimension due to wear. As such wear occurs, the hinges 226 and 232 can undergo simultaneous bending under the action of the coil spring, such that the free ends of the elements move radially inward with respect to the screw axis, while still remaining substantially parallel thereto. Carried by the base portion 214 of the nut body are first and second self-alignment sleeves 74d and 90d, which are similar to those discussed in connection with FIGS. 10–12. The advantage of the construction illustrated in FIGS. 27–30 is that better averaging is possible with multi-element nuts than with nuts comprising merely two elements. This becomes important on accurate nut follower devices where it is desired to keep the overall costs as low as possible. Methods of improving accuracy other than thread-averaging have been found to be more expensive, and usually provide less than satisfactory results.

Yet another embodiment of the invention is illustrated in FIGS. 31–34, showing a nut device generally designated by the numeral 240, comprising a tubular nut body 212a having a base portion 214a and a threaded portion 216a. The latter has a plurality of longitudinal slots 218a, dividing it into multiple elements. In addition, two peripheral recesses 222a, 228a are provided, intersecting the slots 218a to present reduced wall thicknesses of the elements. Multiple holes 224a extend into the bore of the threaded portion 216a, defining thin and narrow hinges 226a (FIG. 33). Similarly, multiple holes 230a in the annular recess 228a define thin and narrow hinge portions 232a. The base portion 214a has a pair of oppositely-disposed transverse slots 242, 244 dividing it into two parts capable of limited flexing movement with respect to one another. One portion carries a single alignment sleeve 50b which is similar to that illustrated in FIGS. 1–7, having solely three pairs of oppositely-disposed transverse slots, the pair adjacent the body slots 242, 244 being circumferentially indexed with respect thereto by an angle of substantially 90°. In addition, one of the remaining pairs of slots in the sleeve is indexed with respect to the first slot pair by an angle of 90°, with the remaining slot pair being in circumferential alignment with said one pair. By such an arrangement, only three slot pairs are required on the sleeve, since part of the alignment is accomplished by the transverse slots 242, 244, in the nut body.

Referring again to FIG. 31 and in accordance with the present invention there is provided means carried by the elements for positively limiting their movement in directions away from one another to predetermined limit positions, the means comprising an annular ring 248 which is particularly illustrated in FIG. 35. The ring is loosely carried on a recessed portion 250 of the elements, and is held in place by the biasing spring 48. During the normal operation of the nut, there is a small clearance space between the inner diameter of the ring 248 and the portions 250 of the elements, on the order of several thousandths of an inch. In the event that a sudden acceleration of the screw occurs, or alternately a shock load is applied to the nut, the ring 248 will prevent the elements from being sprung radially outward passed a predetermined point. Thus the hinges 226a, 232a will not be strained beyond their elastic limits. As a result, the possibility of damage to the nut is greatly minimized. It will be understood that during normal operation, the ring 248 is loosely carried on the portion 250, and does not materially interfere with either the anti-backlash or the self-alignment features of the nut.

From the above it can be seen that I have provided a number of novel and improved anti-backlash and self-aligning nut combinations. The devices are seen to be extremely simple in construction, reliable in operation, and have been found to provide very satisfactory solutions to the various problems encountered in modern equipment of the type requiring accurate follower devices for precision work. By such construction, not only is the absolute amount of backlash reduced, but slight misalignments between the axis of the screw and the device which carries the nut can be well tolerated, and effectively compensated for. The devices are thus seen to represent a distinct advance and improvement in the technology of precision nut followers.

Variations and modifications are possible without departing from the spirit of the invention.

I claim:

1. An anti-backlash, self-aligning nut construction for engagement with a screw, comprising in combination:
    a. an elongate tubular nut body comprising a base portion having a through bore to receive the screw, and having an internally threaded portion aligned with the base portion,
    b. said threaded portion being elongate and having multiple longitudinal slots which divide it into multiple elements,
    c. each of said elements having internal thread formations adapted for engagement with the threads of the screw,
    d. said body having a pair of oppositely-disposed, transverse slots adjoining said longitudinal slots and enabling the elements to have limited movement toward and away from one another, thereby to enable the thread formations thereof to intimately engage the screw without clearance and looseness,
    e. yieldable means carried by the elements, biasing the same in directions toward each other so as to maintain said lack of clearance and looseness,
    f. an elongate spring sleeve surrounding and concentric with said nut body,
    g. means rigidly connecting a portion of said sleeve to the base portion of the nut body,
    h. said sleeve having solely three pairs of oppositely-disposed transverse slots, said pairs being spaced apart from one another along the length of the sleeve,
    i. one of said slot pairs being adjacent to the transverse slots of the body and being circumferentially indexed by substantially 90° with respect to said transverse slots,
    j. a second one of said slot pairs being circumferentially indexed by substantially 90° with respect to the third one of said slot pairs and being aligned with said one slot pair,
    k. said three slot pairs dividing the sleeve into four parts, each part being capable of limited pivoting movement with respect to an adjacent part.

2. The invention as set forth in claim 1, wherein:
    a. the two non-adjacent slot pairs are circumferentially indexed with respect to one another by an angle of substantially 90°.

3. The invention as set forth in claim 1, wherein:
    a. the two non-adjacent slots pairs are substantially in circumferential alignment with one another.

4. A self-aligning nut construction for engagement with a screw, comprising in combination:
    a. an elongate tubular nut body comprising a base portion having a through bore to receive the screw, and having an internally threaded portion aligned with the base portion,
    b. an elongate sleeve surrounding and concentric with said nut body,
    c. means rigidly connecting a portion of said sleeve to the base portion of the nut body,
    d. said sleeve having two pairs of oppositely-disposed transverse slots, said pairs being spaced apart from one another along the length of the sleeve and dividing the latter into three portions, each portion being capable of limited flexing movement with respect to an adjacent portion, e. a second elongate sleeve surrounding and concentric with said first-mentioned sleeve, f. said second sleeve having two pairs of oppositely-disposed transverse slots spaced apart from one another along the length of the second sleeve and dividing the latter into three portions, each portion being capable of limited flexing movement with respect to an adjacent portion, g. means rigidly connecting an end portion of said second sleeve to an end portion of the first sleeve, said second sleeve being adapted as its other end portion for connection to a machine part which undergoes movement in directions substantially parallel to the screw axis, h. said sleeves thereby enabling alignment of the nut body on the screw with respect to the machine part.

5. The invention as defined in claim 4, wherein:

a. one pair of slots in the first sleeve is circumferentially indexed by an angle of substantially 90° with respect to the other pair of slots, b. one pair of slots in the second sleeve being circumferentially indexed by an angle of substantially 90° with respect to the other pair of slots therein, c. said one pair of slots in the first sleeve being adjacent to said one pair of slots in the second sleeve and being circumferentially indexed by an angle of substantially 90° with respect thereto.

6. The invention as defined in claim 4, wherein:

a. one pair of slots in the first sleeve is substantially in circumferential alignment with respect to the other pair of slots therein, b. one pair of slots in the second sleeve being substantially in circumferential alignment with respect to the other pair therein, c. said one pair of slots in the first sleeve being adjacent to said one pair of slots in the second sleeve and being circumferentially indexed by an angle of substantially 90° with respect thereto.

7. The invention as set forth in claim 4, wherein:

a. said threaded portion is elongate and has longitudinal slots which divide it into multiple elements, b. said body further having a pair of oppositely disposed transverse slots enabling the elements to have limited movement toward and away from one another and to engage the screw without clearance and looseness, and c. yieldable means carried by the elements, biasing the same in radially inward directions with respect to the screw so as to maintain said lack of clearance and looseness.

8. A self-aligning nut construction for engagement with a screw, comprising in combination:

a. an elongate tubular nut body comprising a base portion having a through bore to receive the screw, and having an internally threaded portion aligned with the base portion, b. an elongate spring sleeve surrounding and concentric with said nut body, c. means rigidly connecting a portion of said sleeve to the base portion of the nut body, d. said sleeve having a pair of oppositely-disposed transverse slots dividing it into two portions, each portion being capable of limited flexing movement with respect to the other, e. a second elongate spring sleeve surrounding and concentric with said first sleeve, f. said second sleeve having a pair of oppositely-disposed transverse slots dividing it into two portions, each portion being capable of limited flexing movement with respect to the other, g. means rigidly connecting one portion of said second sleeve to one portion of the first sleeve, h. a third elongate spring sleeve surrounding and concentric with said second sleeve, i. said third sleeve having a pair of oppositely-disposed transverse slots dividing it into two portions, each being capable of limited flexing movement with respect to the other, j. means rigidly connecting one portion of said third sleeve to one portion of said second sleeve, k. a fourth elongate spring sleeve surrounding and concentric with said third sleeve, l. said fourth sleeve having a pair of oppositely-disposed transverse slots dividing it into two portions, each portion being capable of limited flexing movement with respect to the other, and m. means rigidly connecting one portion of said fourth sleeve to one portion of said third sleeve, said fourth sleeve being adapted for connection to a machine part which undergoes movement in directions substantially parallel to the screw axis, n. said slots being divided into two sets, each set consisting of two pairs aligned with each other, the slots of one set being circumferentially indexed by an angle of substantially 90° with respect to the slots of the other set, o. said sleeves enabling limited self-alignment of the nut body on the screw with respect to the machine part.

9. The invention as set forth in claim 8, wherein:

a. said threaded portion is elongate and has longitudinal slots which divide it into multiple elements, and b. yieldable means carried by the elements, biasing the same in radially inward directions with respect to the screw.

10. A self-aligning nut construction for engagment with a screw, comprising in combination:

a. an elongate tubular nut body comprising a base portion having a through bore to receive the screw, and having an internally threaded portion aligned with the base portion, b. said threaded portion being elongate and having multiple longitudinal slots which divide it into multiple elements, c. each of said elements having internal thread formations adapted for engagement with the threads of the screw, d. said body having a pair of oppositely-disposed transverse slots adjoining said longitudinal slots and enabling the elements to have limited movement toward and away from one another, thereby to enable the thread formations thereof to intimately engage the screw without clearance and looseness, e. yieldable means carried by the elements, biasing the same in directions toward each other so as to maintain said lack of clearance and looseness, f. an elongate spring sleeve surrounding and concentric with said nut body, g. means rigidly connecting a portion of said sleeve to the base portion of the nut body, h. said sleeve having a pair of oppositely-disposed transverse slots dividing it into two portions, each portion being capable of limited flexing movement with respect to the other, said pair of sleeve slots being circumferentially indexed with respect to the pair of slots on the nut body by an angle of substantially 90°, i. a second elongate spring sleeve surrounding and concentric with said first sleeve, j. said second sleeve having a pair of oppositely-disposed transverse slots dividing it into two portions, each portion being capable of limited flexing movement with respect to the other, k. means rigidly connecting one portion of said second sleeve to one portion of the first sleeve, l. a third elongate spring sleeve surrounding and concentric with said second sleeve, m. said third sleeve having a pair of oppositely-disposed transverse slots dividing it into two portions, each portion being capable of limited flexing movement with respect to the other, the pair of slots on the third sleeve being circumferentially indexed with respect to the pair of slots on the second sleeve by an angle of substantially 90°, one of said immediately preceding pairs being circumferentially indexed with respect to the pair of slots on the first sleeve by an angle of substantially 90°, and n. means rigidly connecting one portion of said third sleeve to one portion of said second sleeve, said third sleeve being adapted for connection to a machine part which undergoes movement in directions substantially parallel to the screw axis, o. said sleeves enabling limited self-alignment of the nut body on the screw with respect to the machine part.

11. An anti-backlash nut construction for engagement with a screw, comprising in combination:

a. an elongate tubular nut body comprising a base portion having a through bore to receive the screw, and having a pair of internally threaded portions aligned with the base portion and extending in opposite directions therefrom, b. each of said threaded portions being elongate and having multiple longitudinal slots which divide them respectively into multiple elements, c. said elements having internal thread formations adapted for engagement with the threads of the screw, d. said body further having two pairs of oppositely-disposed transverse slots adjoining said longitudinal slots respectively and enabling the elements to have limited flexing movement in radially inward directions with respect to the screw and to intimately engage the latter without clearance and looseness, e. said base portion and two threaded portions constituting a double-ended nut.

12. The invention as set forth in claim 11, and further including:

a. an elongate spring sleeve having a through bore substantially in alignment with the nut body, b. means rigidly connecting a portion of said sleeve to the base portion of the nut body, c. said sleeve having two pairs of oppositely-disposed transverse slots, said pairs being spaced apart from one another along the length of the sleeve, d. a second elongate sleeve concentric with the first and having a through bore substantially in alignment with the nut body, e. means rigidly connecting one portion of said second sleeve to one portion of the first sleeve, f. said second sleeve having two pairs of oppositely-disposed transverse slots, said pairs being spaced apart from one another along the length of the second sleeve and dividing the second sleeve into three portions, each portion being capable of limited flexing movement with respect to an adjacent portion, one of said immediately preceding portions being adapted for connection to a machine part which undergoes movement in directions substantially parallel to the screw axis, g. two of said pairs being substantially in circumferential alignment with respect to one another, the other two pairs being substantially in circumferential alignment with respect to one another and circumferentially indexed by an angle of substantially 90° with respect to said two pairs, h. said sleeves enabling limited self-alignment of the nut body on the screw with respect to the machine part.

13. The invention as set forth in claim 12, wherein:

a. said means rigidly connecting a portion of said first sleeve to the base portion of the nut body comprises a third sleeve coaxial with the first two and disposed therewithin, said third sleeve being substantially rigid.

14. An anti-backlash nut construction for engagement with a screw, comprising in combination:

a. an elongate tubular nut body comprising a base portion having a through bore to receive the screw, and having an internally threaded portion aligned with the base portion, b. said threaded portion having pairs of elongate longitudinal slots which divide it into pairs of elements, c. each of said elements having internal thread formations adapted for engagement with the threads of a screw extending through said body portions, d. said nut body having external recesses in said elements providing reduced wall thicknesses at the inner ends of the elements and the base portion, e. said hinges enabling limited flexing movement of said elements in radial directions with respect to the screw so as to enable the thread formations thereof to engage the screw without clearance and looseness, and f. yieldable means carried by and separate from said elements, biasing the same in radially inward directions with respect to the screw so as to maintain said lack of clearance and looseness.

15. The invention as set forth in claim 14, wherein:

a. said base portion of the nut body has a pair of oppositely-disposed transverse slots dividing it into two parts, and enabling the parts to have limited flexing movement with respect to one another.

16. The invention as set forth in claim 14, wherein:

a. said body has a plurality of radially extending holes intersecting said recesses and providing increased flexibility to said hinges.

17. The invention as set forth in claim 14, wherein:

a. said body has additional external recesses in said elements, spaced from said first recesses and providing additional reduced wall thicknesses of the constituting additional hinges between said elements and base portion,
b. said hinges of each element enabling simultaneous equidistant movement of large areas of the element toward and away from the screw axis.

18. The invention as set forth in claim 17, wherein:
a. said elements have a plurality of radially extending holes intersecting said additional external recesses and providing increased flexibility to said additional hinges.

19. The invention as set forth in claim 17, wherein:
a. said base portion of the body has a pair of oppositely-disposed transverse slots dividing it into two parts and enabling the parts to have limited flexing movement with respect to one another.

20. The invention as set forth in claim 19, and further including:
a. an elongate spring sleeve surrounding and concentric with said nut body,
b. means rigidly connecting a portion of said sleeve to the base portion of the nut body,
c. said sleeve having solely three pairs of oppositely-disposed transverse slots, said pairs being spaced apart from one another along the length of the sleeve,
d. one of said sleeve slot pairs being adjacent to the transverse slots of the body and being circumferentially indexed by substantially 90° with respect thereto,
e. a second one of said sleeve slot pairs being circumferentially indexed by substantially 90° with respect to the third one of said slot pairs, and being aligned with said one slot pair,
f. said three sleeve slot pairs dividing it into four parts, each part being capable of limited pivoting movement with respect to an adjacent part.

21. The invention as set forth in claim 17, and further including:
a. an elongate sleeve surrounding and concentric with said nut body,
b. means rigidly connecting a portion of said sleeve to the base portion of the nut body,
c. said sleeve having two pairs of oppositely-disposed transverse slots, said pairs being spaced apart from one another along the length of the sleeve and dividing the latter into three portions, each portion being capable of limited flexing movement with respect to an adjacent portion,
d. a second elongate sleeve surrounding and concentric with said first-mentioned sleeve,
e. said second sleeve having two pairs of oppositely-disposed transverse slots spaced apart from one another along the length of the second sleeve and dividing the latter into three portions, each portion being capable of limited flexing movement with respect to an adjacent portion,
f. means rigidly connecting an end portion of said second sleeve to an end portion of the first sleeve, said second sleeve being adapted at its other end portion for connection to a machine part which undergoes movement in directions substantially parallel to the screw axis,
g. said sleeve slots being divided into two sets, each set consisting of two pairs aligned with each other, the slots of one set being circumferentially indexed by an angle of substantially 90° with respect to the slots of the other set,
h. said sleeves thereby enabling alignment of the nut body on the screw with respect to the machine part.

22. The invention as set forth in claim 14, and further including:
a. means carries by said elements for positively limiting their movement in directions away from one another to predetermined limit positions, thereby to prevent the elements from being inadvertently sprung apart.

23. The invention as set forth in claim 22, wherein:
a. said limiting means comprises an annular ring loosely carried by the threaded portion, and engaging the outer surfaces thereof,
b. outward movement of said elements past a certain point being limited by said ring.

* * * * *